(12) United States Patent
Kendall

(10) Patent No.: US 6,372,160 B1
(45) Date of Patent: Apr. 16, 2002

(54) PROCESS FOR USING AQUEOUS RELEASE COMPOUND

(75) Inventor: Steven S. Kendall, Howell, MI (US)

(73) Assignee: Genesee Polymers Corporation, Flint, MI (US)

(*) Notice: Subject to any disclaimer, the term of this patent is extended or adjusted under 35 U.S.C. 154(b) by 0 days.

(21) Appl. No.: 09/332,654

(22) Filed: Jun. 14, 1999

Related U.S. Application Data

(60) Provisional application No. 60/095,508, filed on Aug. 6, 1998.

(51) Int. Cl.$^7$ ................................................. B28B 7/36
(52) U.S. Cl. ..................... 264/39; 264/51; 264/238; 264/338; 106/38.22; 106/287.53; 249/115; 427/133; 427/235; 427/236; 427/353; 427/387; 427/421
(58) Field of Search ........................... 264/39, 51, 238, 264/338; 427/133, 353, 387, 421, 235, 236; 106/38.22, 287.13; 249/115

(56) References Cited

U.S. PATENT DOCUMENTS

| | | |
|---|---|---|
| 2,514,296 A | 7/1950 | Small et al. |
| 3,413,390 A | 11/1968 | Heiss |
| 3,423,503 A | 1/1969 | York |
| 3,694,530 A | 9/1972 | Wolfe |
| 3,848,037 A | 11/1974 | Harper |
| 3,893,868 A | 7/1975 | Klement et al. |
| 3,929,499 A | 12/1975 | Thomas |
| 3,931,381 A | 1/1976 | Lindberg |
| 3,959,242 A | 5/1976 | Watts et al. |
| 3,968,302 A | 7/1976 | Brown |
| 3,992,502 A | 11/1976 | Krishnan |
| 3,993,606 A | 11/1976 | von Bonin et al. |
| 4,002,794 A | 1/1977 | Schwarcz |
| 4,028,120 A | 6/1977 | Emond |
| 4,038,088 A | 7/1977 | White et al. |
| 4,098,731 A | 7/1978 | von Bronin et al. |
| 4,110,397 A | 8/1978 | Wooler |
| 4,130,698 A | 12/1978 | Sparrow et al. |
| 4,131,662 A | 12/1978 | Cekoric et al. |
| 4,172,870 A | 10/1979 | Whitchurch |
| 4,184,880 A | 1/1980 | Huber et al. |
| 4,308,063 A | 12/1981 | Horuchi et al. |
| 4,312,672 A | 1/1982 | Blahak et al. |
| 4,331,736 A | 5/1982 | Schäfer et al. |
| 4,396,729 A | 8/1983 | Dominquez et al. |
| 4,427,803 A | 1/1984 | Fukui et al. |
| 4,431,455 A | 2/1984 | Brown et al. |
| 4,451,425 A | 5/1984 | Meyer |
| 4,454,050 A | 6/1984 | Bertell |
| 4,472,341 A | 9/1984 | Alberino et al. |
| 4,473,403 A | 9/1984 | Wesala |
| 4,491,607 A | 1/1985 | Wesala |
| 4,532,096 A | 7/1985 | Bogner et al. |
| 4,534,928 A | 8/1985 | Martin |
| 4,609,511 A | 9/1986 | Fischer et al. |
| 4,752,428 A | 6/1988 | Williams et al. |
| 4,770,827 A | 9/1988 | Fischer |
| 4,783,296 A | 11/1988 | Fischer et al. |
| 4,785,067 A | 11/1988 | Brumbill |
| 4,797,445 A | 1/1989 | Piskoti |
| 4,936,917 A | 6/1990 | Harakal et al. |
| 4,969,952 A | 11/1990 | Hattich et al. |
| 4,972,030 A | 11/1990 | Bauman |
| 5,013,808 A | 5/1991 | Piskoti |
| 5,028,366 A | 7/1991 | Harakal et al. |
| 5,034,446 A | 7/1991 | Kendall et al. |
| 5,112,543 A * | 5/1992 | Thary ........................ 264/51 |
| 5,218,024 A | 6/1993 | Krug et al. |
| 5,525,640 A | 6/1996 | Gerkin et al. |
| 5,648,419 A | 7/1997 | Kendall |
| 5,696,173 A | 12/1997 | Kendall |

FOREIGN PATENT DOCUMENTS

| | | |
|---|---|---|
| DE | 1 816 453 | 6/1970 |
| DE | 26 37 919 | 8/1975 |
| DE | 27 02 930 | 1/1977 |
| DE | 28 05 951 | 2/1978 |
| EP | 0 223 233 | 11/1986 |
| GB | 1043572 | 9/1966 |
| GB | 1193882 | 6/1970 |
| RU | 592606 | 2/1978 |

* cited by examiner

*Primary Examiner*—Suzanne E. McDowell
(74) *Attorney, Agent, or Firm*—Young & Basile, P.C.

(57) ABSTRACT

A process for preparing a mold used for producing, for example, high resilience polyurethane foamed articles, comprises the step of spraying an aqueous release compound on the inner, article-contacting surface of the mold, the release compound including: an aqueous carrier; and a release agent which forms a release film on the article-contacting surface, wherein the release film is formed by evaporating a majority of the aqueous carrier. An aqueous rinse solution is gently sprayed on the inner mold surface after formation of the release film. The rinse solution, now carrying residual water, emulsifier(s) and/or contaminants, is mechanically removed via an air entrainment device before significant evaporation of the rinse solution has taken place.

23 Claims, No Drawings

PROCESS FOR USING AQUEOUS RELEASE COMPOUND

CROSS-REFERENCE TO RELATED APPLICATION

This application claims the benefit of U.S. Provisional Application Serial No. 60/095,508, filed Aug. 6, 1998.

BACKGROUND OF THE INVENTION

The present invention relates generally to mold release compounds, and more specifically to such compounds which are aqueous and suitable for use with molds for foamed polymeric products.

Release agents are materials that are applied to the surface of a mold in order to increase the removability of the molded products from the mold surface. It is usually desirable to deposit a very thin coating of the release agent on the mold surface. To facilitate the application of such a thin film, the release agent is commonly dispersed in a volatile carrier. After the release agent and carrier have been applied to the mold surface, the carrier evaporates, leaving the desired thin film of release agent.

The term "release agent" as used herein shall refer to the material that affects the release of the molded part. The release agent is the functional component that remains on the mold surface after the carrier has evaporated. The term "release compound" as used herein shall refer to the combined release agent and its carrier system.

Carriers commonly used in release compounds can be divided into two categories: hydrocarbon solvent carriers and aqueous carriers. The term "solvent-based" as used herein shall refer to release compounds that use hydrocarbon solvents as the carrier. The terms "aqueous" or "water-based" as used herein shall refer to release compounds that use water as the carrier.

There are a number of disadvantages to the use of solvent-based release compounds. The evaporation of hydrocarbon solvents has a negative effect on the environment, and, in many areas, government restrictions limit the quantity of hydrocarbon emissions. Handling hydrocarbon solvents also poses health risks to personnel. Further, most hydrocarbon solvents are flammable, thus a fire risk is associated with their use. Also, hydrocarbon solvents are more expensive than water. Therefore, water-based release compounds are a highly desirable alternative to solvent-based release compounds.

Various substances have been used as release agents. Soaps and organo-metal salts for which solubility may range from water-soluble (hydrophilic) to water-insoluble (hydrophobic) have been used as release agents. Various organic oils, waxes and pastes have also served as release agents. Due to their low surface energy, silicones are frequently used as release agents. Silicones may take the form of oils, waxes or resins which range from the extremely hydrophobic species which contain only methyl functionality on a polysiloxane structure, to hydrophilic species such as methyl-polyol functional polysiloxane and polysiloxane with organo-salt functionality. There exist applications where each of these release agents is said to perform well. However, some of the most effective release agents are quite hydrophobic. Organo-functional silicones (including dimethyl silicones) and saturated hydrocarbons with little or no oxygen content are examples of hydrophobic materials that are very effective in many release applications.

In order to formulate a water-based release compound of hydrophobic release agents, it is necessary to use rather hydrophilic emulsifiers or surfactants. If a sufficient quantity of emulsifier is mixed with a hydrophobic release agent, a stable emulsion or dispersion can be formed by gently mixing the ingredients with water. However, a quantity of emulsifier sufficient to provide a stable emulsion with gentle mixing generally interferes with the release effectiveness of the release agent once the water carrier has evaporated. When a quantity of emulsifier low enough to avoid substantially hindering the release effectiveness of the release agent is used, intense mixing is required during the emulsification process. Emulsions that require intense mixing in order to form a stable emulsion are referred to as high-energy emulsions.

The fact that high-energy emulsions can deliver highly effective release agents with minimal emulsifier to a mold surface while using water as the carrier makes them an important class of release compounds. High-energy emulsions find use in die casting, plastic molding, natural rubber latex foam molding, polyvinylchloride (PVC) foam molding, and other release applications.

A class of molding operations that is particularly difficult to release is reactive molding. Reactive molding operations involve mixing chemicals (usually liquids) that react within the mold to form a solid part. The reactive chemicals being molded are usually quite adhesive. Additionally, the chemical reaction mechanism of the material being molded is often sensitive to water or emulsifiers. When using a water-based release compound, a reaction may occur between residual water or emulsifiers (or both) and the chemicals being molded. Such competing reactions usually cause imperfections in the molded part. Thus, the use of water-based release compounds in reactive molding operations presents problems.

The process of molding foamed plastic or rubber incorporates a method of trapping a gas within the curing part. The gas may be generated as a by-product of a chemical reaction, by boiling a volatile component or simply by mechanical gas entrainment just prior to filling the mold. The gas ideally forms foam that is uniform throughout the part being molded. It is necessary for the foam formed within the mold to be stable until the part cures so that the physical properties of the molded part are uniform. Often, residual water and emulsifiers from water-based release compounds left on the mold surface, working individually or in combination, act to destabilize the foam within the mold. This results in surface imperfections, voids and non-uniform foam density throughout the molded part, as discussed further below.

The process of molding polyurethane parts is an application for which the use of water-based release compounds has proven particularly problematic. The reactive materials used in polyurethane processes can chemically react with water and with the hydroxyl groups that are often found in emulsifiers. Additionally, the foam within foamed polyurethane parts is sensitive to residual water and/or emulsifiers on the mold surface. For example, water remaining in the mold release composition prior to pouring results in competitive reactions between the water/isocyanate and the polyol/isocyanate. This reaction of water with isocyanate results in carbon dioxide generation which leads to surface and subsurface defects in the foam product including bubbles, blisters, voids and, if severe enough, foam collapse.

In U.S. Pat. No. 4,473,403 issued to Wesala, a water based release compound is disclosed for use in polyurethane foam molding applications. In the Wesala invention, the complete evaporation of water is assured by the inclusion of alcohol, which acts as an evaporation accelerator in the release compound formulation. However, this inclusion of volatile organic alcohol as an evaporation accelerator is counterproductive to the goal of eliminating organic emissions (a primary motive for using water-based release compounds).

In U.S. Pat. No. 4,609,511 issued to Fischer and Krug, a method of suppressing the competing reaction between water and isocyanate in polyurethane molding operations is proposed. This method involves masking of the water molecules through the effect of lyotropic mesomorphism. It is explained that lyotropic mesomorphism is a state where substances simultaneously have properties of liquids and crystalline bodies. The process of the '511 invention is accomplished by adding masking agents to release effective substances (release agents). Suitable masking agents are considered to be conventional surfactants (emulsifiers) which include fatty alcohol polyglycol ethers, particularly ethoxylated fatty alcohols with an HLB-value of 8 to 15. Some release effective substances that are considered suitable for use in the '511 invention include waxes, greases, fats, and silicone compounds.

However, in sharp contrast to the '511 invention, in U.S. Pat. No. 4,783,296 issued to Fischer, Hattich, Krug and Schuster, it is stated that conventional soap emulsions form an aqueous micella, and conventional emulsifiers form water-combining pseudocrystalline structures. Both structures are said to prevent the water carrier from completely evaporating. It is explained in the '296 reference that water thus trapped has an adverse effect on the molded polyurethane part. The invention claimed in the '296 reference involves the addition to conventional release compounds of an aqueous solution of alkali metal salts of higher (eg. $C_{18}$–$C_{30}$) fatty acids and higher (eg. $C_4$–$C_{26}$) alcohols. The additive in the '296 reference is claimed to prevent water from being trapped by conventional emulsifiers so that evaporation is more complete. As has been shown, this approach appears to be contradictory to the approach set forth in U.S. Pat. No. 4,609,511. In addition, the inclusion of alcohol as an additive may be counterproductive to the goal of eliminating organic emissions, as stated above.

The viable use of emulsifiers in aqueous release compounds is further questioned in U.S. Pat. No. 4,969,952 issued to Hattich, Krug and Schuster. The '952 reference states that the release activity of a release compound is reduced by the addition of emulsifiers. In certain cases, it is further stated that the release activity can be completely eliminated by the addition of emulsifiers. The '952 disclosure asserts that only one class of emulsifiers (ammonium salts) does not interfere with the mold removal characteristics. The '952 invention uses these ammonium salt(s) to emulsify a release-active substance comprising one or more aliphatic primary, secondary and/or tertiary amines with at least one $C_{12}$–$C_{24}$ alkyl radical.

The problems associated with residual water and emulsifiers adversely affecting polyurethane molding operations are also discussed in U.S. Pat. No. 5,028,366 issued to Harakal et al. This patent points out that a common problem with most water-based release compounds is that they tend to cause excessive build up on the mold surface. In addition, it is also pointed out that another cause of release problems and surface defects associated with the use of water-based mold release compositions is the physical break-down and removal of the release coating from that part of the mold upon which the foaming components impinge when charged or poured into the mold. The disclosure explains that the pouring physically erodes or washes off the release coating, especially when the coating is liquid at the mold pour temperature.

To counteract this problem, the '366 reference discloses a water-based release compound that includes a release agent which is a wax that is solid at the mold pour temperature and a liquid at de-mold temperature. The '1366 reference indicates that the water carrier need not be evaporated prior to molding the polyurethane part. It claims that the residual water is bound up in a wax/emulsifier matrix thus preventing the water from adversely affecting the polyurethane part. However, as can be appreciated, there are drawbacks associated with using a wax having these solid/liquid properties. It may be more difficult to apply a solid (as opposed to a liquid) release agent to the mold surface(s). Further, there would be less choice in release agents, since they would have to possess very specific solid/liquid properties, dependant upon the specific molding operation parameters. Each of these drawbacks adds expense to the molding operation, as well as undesirable opportunities for error.

Inventors Krug and Fischer in U.S. Pat. No. 5,218,024 affirm that water-based release agents continue to be a problem in that they are slow to evaporate, and cause the formation of polyureas (formed by the side reactions of the isocyanate with the residual water fraction of the release agent film). The inventors state that the polyureas cause reactive coatings which adhere to the die surfaces, having a negative effect on the release action and resulting in the necessity for expensive, intensive cleaning. As a result, the '024 disclosure offers no solution to the known problems with water-based release agents, and turns away from any type of aqueous release compound at all. The inventors propose a release agent which is both water- and solvent-free.

These examples of prior art make it clear that the water introduced by release compounds should be substantially eliminated (or at least masked) before molding a polyurethane part. As can be seen, the use of high-energy emulsions of hydrophobic release agents without additives is not suggested in the prior art. This is due to the stated adverse effects caused by water and hydrophilic emulsifiers, acting alone or in combination, which are contained in high-energy emulsions.

The fact that the prior art contains so many differing and contradictory theories as to the reason that water and emulsifiers have an adverse effect on molding operations, especially polyurethane molding operations, makes it clear that the problem is not fully understood. In industry today, there remains a number of polyurethane molding processes for which no suitable water-based release compound has yet been found. The molding of polyurethane high resiliency (HR) foam for automotive seating is one application for which no suitable water-based release compound has been found.

The use of the water-based release compounds mentioned above also presents many drawbacks in addition to those stated. The necessity to use materials that mask the effects of water and emulsifiers, or to use additives that eliminate water may be a deterrent to the use of water-based release agents. Additives to the release compound that mask residual water may also undesirably mask the release properties of the release agent. Additives to the release compound that break the pseudocrystalline structures formed by water and emulsifiers may also interfere with the release agent. In all cases, such additives introduce extra expense in raw material and processing cost.

Thus, it is an object of the present invention to provide a process for the application and use of a mold release compound that facilitates the production of good quality parts in molding operations, including reactive molding operations, while using high-energy emulsions as water-based release compounds.

Yet further, it is an object of the present invention to provide such a process which advantageously eliminates the effect residual water and emulsifiers have on reactive molding operations without the use of additives.

It is a further object of the present invention to provide such a process that improves the performance of known release agents in reactive molding applications.

Still further, it is an object of the present invention to provide a test for the suitability of a particular release compound for use in the process of the present invention.

SUMMARY OF THE INVENTION

The present invention addresses and solves the above-mentioned problems and drawbacks and meets the enumerated objects and advantages, as well as others not enumerated, by providing a process for preparing a mold used for producing polymeric articles which are sensitive to aqueous release compounds, such as, for example, high resilience polyurethane foams. The process comprises the step of applying an aqueous release compound to the inner, article-contacting surface of the mold, the release compound including an aqueous carrier, and a release agent which forms a release film on the article-contacting surface. In a preferred embodiment, the release compound comprises a high-energy emulsion. The process further, and unexpectedly, comprises the step of applying an aqueous rinse solution to the inner, article-contacting surface of the mold after formation of the release film. The rinse solution may simply comprise tap water. Finally, the process comprises the step of removing the rinse solution.

In a preferred embodiment, both the release compound and the rinse solution are applied by spraying. The preferred means of removing the rinse solution, preferably before significant evaporation of the rinse solution, is by an air entrainment means comprising at least one of a vacuum and an air jet.

Other objects, features and advantages of the present invention will become apparent by reference to the following detailed description.

DETAILED DESCRIPTION OF THE PREFERRED EMBODIMENTS

It is well accepted in the prior art that water should be eliminated from the surface of a mold before molding water-sensitive reactive foams, for example polyurethane foam. Various methods have been given as examples of prior art techniques of eliminating, encapsulating and masking residual water from the carrier system of water-based release agents.

However, the present inventor has unexpectedly and fortuitously discovered that the heretofore accepted assumption that water should be eliminated from such a mold surface is not entirely correct. Without being bound to any theory, it is believed that water has not been the major cause of the many problems enumerated above in relation to water-based release compounds. Instead, it is believed that contaminants (including residue from previously molded parts, unreacted polyols, etc.) remaining on the mold surface are concentrated by water droplets, and this concentration of contaminants is what causes undesirable effects on the mold surface and subsurface. Thus, it is believed that, if the contaminants were removed, one could leave a small amount of water on the mold surface(s) with no resultant deleterious effects.

Thus, the present invention offers a novel and counter-intuitive process for preparing a mold used for producing polymeric articles which are sensitive to aqueous release compounds. The process uses an aqueous release compound, and applies additional water to the mold surface after the release agent has been applied. As can be readily discerned from the above discussion of the relevant art, one skilled in the art would expect that introducing additional water by way of a rinse step would exacerbate the aforementioned problems associated with residual water. However, on the contrary, it has been unexpectedly and fortuitously discovered that such a rinse step virtually eliminates the aforementioned adverse effects associated with residual water, emulsifiers, and other contaminants found on a mold surface.

It has been discovered that contaminants and residues remaining on the mold surface which are responsible for the imperfections encountered when using many water-based release compounds are somewhat hydrophilic. These contaminants include emulsifiers, water and residue from reactive materials that were previously molded. The process of the present invention involves the steps of applying an aqueous release compound, forming a release film, applying an aqueous rinse solution, and mechanically removing the aqueous rinse solution, preferably before significant evaporation of the rinse solution has taken place.

According to the present invention, the application of the release compound may be accomplished by any suitable method. Many application methods are known in the art, such as spraying, swabbing or brushing. Those skilled in the art may readily choose an appropriate release compound application method for a particular molding operation. In the preferred embodiment, the application method is spraying.

The step of forming a release film may be accomplished by any method that causes the release agent to adhere to the mold surface. Film forming methods are well known to those skilled in the art. Examples of known methods for forming a release film on a mold surface after the application of a release compound include utilizing curable chemistry in the release compound, and employing splittable emulsifiers such as Triton SP, commercially available from Union Carbide. By changing the pH of a release compound formulated with splittable emulsifiers, the emulsion is broken, thus allowing the release film to form. In the preferred embodiment, the method of forming a release film is by evaporation of a majority of the release compound's volatile carrier (water). Depending upon the emulsifier used, the amount of water remaining in the film may be less than about 5%. However, in the preferred embodiment, the amount of water remaining in the film may be less than or equal to about 2%.

The step of applying an aqueous rinse solution to the mold surface may be accomplished by any means that does not remove the release film, such as spraying, pouring, swabbing, or dipping. In the preferred embodiment, the rinse solution is applied by a gentle, low pressure spray. It is to be understood that, if a spray is used, any suitable spray may be used, even for example, a spray gun typically found at a kitchen sink. However, in the preferred embodiment, the spray is supplied through a sharp edged orifice. The maximum rinse water spray pressure should be chosen to avoid removal of the release agent film. In the preferred embodiment, the pressure ranges between about 10 psi and about 100 psi; and more preferably between about 10 psi and about 50 psi. However, it is to be understood that these are exemplary pressures—the main purpose being non-removal of release agent film. As such, it is contemplated that, with a proper combination of particle size, impingement velocity, duration of impingement, and intensity or impacts per second, one could design an orifice which would produce such a fine particle of water that removal of the release film would be avoided at pressures up to 2000 psi –4000 psi.

It is to be understood that any suitable rinse solution may be used in the present invention. However, in the preferred embodiment, the aqueous rinse solution is tap water. It has been demonstrated that minerals contained in tap water do not adversely affect the molded part. Soft water and distilled water have also been successfully used as an aqueous rinse in the process of the present invention. The aqueous rinse solution may optionally include additives such as detergents and surfactants, which aid in removing surface contaminants.

The step of removing the aqueous rinse solution can be accomplished by any means that preferably prohibits significant water evaporation of the rinse solution. Examples of suitable methods of rinse solution removal include gravity draining, gas entrainment (by positive pressure jet or negative pressure vacuum), sponging, or any combination of such mechanical means. In the preferred embodiment, the method of aqueous rinse solution removal is by air entrainment with a vacuum. Evaporation of the aqueous rinse solution on the mold surface should be minimized. If significant evaporation occurs, contaminants contained in the rinse solution may be re-deposited on the mold surface, thereby resulting in adverse effects on the parts subsequently molded.

It is believed that the function of the rinse water used in the present invention is to remove harmful remaining emulsifiers and other contaminants from the mold surface. Thus, it is not essentially the evaporation of the rinse water which should be minimized; but rather, what should be minimized is the re-deposition of contaminants (contained in the rinse water) onto the mold surface. It is to be understood that, if a high enough volume of rinse water were to flow over the mold, harmful contaminants may be substantially displaced early on, and residual rinse water may be sufficiently contaminant-free that its evaporation would not deposit harmful materials on the mold surface. However, it is believed that the use of such large rinse water quantities would not be economical or efficient. Thus, the amount of rinse water contemplated in the present invention may be quite low, such as for example, as low as between about one pint and about one quart of rinse water per molded part. This is advantageously cost effective and environmentally conscientious. However, with such a low quantity of rinse water, it is preferred that a majority of the rinse water be removed before significant evaporation occurs in order to substantially prevent contaminant re-deposition. As such, it is to be understood that the preference for such removal before significant evaporation of "rinse water" refers to "contaminant-laden" rinse water, the evaporation of which may result in the re-deposition of contaminants onto the mold surface in sufficient quantity to adversely affect the molded part.

Release compounds suitable for use in the present process are any which form a release film that does not rinse off during the aqueous rinse step. While the present process has been developed for use with water-based release compounds, utility may be found when solvent-based release compounds are used.

A screening test for the suitability of a particular release compound may be conducted. A release compound is applied to a suitable material, such as a glass slide or metal panel. The release film is then formed under conditions similar to those of the proposed molding conditions. Then the release film is rinsed gently under flowing water. If an inspection of the panel surface indicates that the release film is intact, the release agent is suitable for use in the process of the present invention. However, if the release film is removed by the aqueous rinse, the particular release compound is not a good candidate for use with the process of the present invention.

High-energy emulsions of hydrophobic release agents have proven suitable for use in the process of the present invention in HR urethane molding tests. When a high-energy emulsion is used as the release compound, the release film is formed when the emulsion is broken. Breaking an emulsion is generally defined as causing the release agent to separate from the water carrier. It is believed that for a high-energy emulsion of a release agent, there comes a point during the water carrier evaporation where the suspended droplets of release agent coalesce. This usually happens before all of the water is evaporated. Once the release agent droplets coalesce, the suspension of release agent in water cannot be restored without intensive mixing. If the particular high-energy emulsion is suitable for use in the present process, the release agent will adhere to the mold surface and will not significantly rinse off during the aqueous rinse step.

It is to be understood that the release agent may be selected from a wide range of release agents. As can be seen in the Examples hereinbelow (ie. RA-4), even an unknown release agent used in conjunction with the process of the present invention resulted in the advantageous elimination of voids from the molded part. In the preferred embodiment, the release agent should be chosen depending upon: its suitability for a desired molding process (HR urethane molding being merely one example of a molding process); and its ability to form a film which does not rinse off.

Through the use of the present invention, remaining emulsifiers, residual water and other contaminants can be sufficiently removed from the surface of a hydrophobic release agent film on a mold surface to facilitate the production of good quality parts. The application of an aqueous rinse solution to the mold surface after the release compound has been applied and the release film has formed is believed to bring the emulsifiers, contaminants and residual water into solution. According to the present invention, this aqueous solution is then removed by mechanical means without significant water evaporation. Surprisingly, this method does not substantially remove the release agent from the mold surface.

It is not known if the emulsifiers, contaminants and water are completely removed from the mold surface by the process of the present invention. However, it has been demonstrated that the adverse effects on the molded part that are associated with emulsifiers, contaminants and residual water are substantially eliminated by the present inventive process.

The present invention does not require the complete evaporation of the water carrier from a release agent film. It does require that the release agent film has formed to the extent that the release agent is not removed during the subsequent aqueous rinse step. When the release compound being used is a high-energy emulsion, sufficient water must be evaporated to break the emulsion before the rinse water is applied. This is accomplished quickly at the mold temperatures commonly used in reactive molding operations.

The rinse water and surface contaminants are then removed by mechanical means.

The fact that the emulsifiers have been substantially removed with the rinse water through mechanical means allows any fugitive rinse water to evaporate quickly. The previous problem of emulsifiers trapping traces of water is essentially eliminated because the emulsifiers have been essentially removed. Additionally, mechanically removing water is usually faster than its evaporation at the mold temperatures employed in high resilience (HR) urethane foam molding operations. Thus, the time required for the additional steps of the present invention are offset by the faster mechanical drying.

Thus far the process of the present invention has been tested in HR urethane foam molding applications. However, it is expected that other molding operations that have proven to be sensitive to water-based release agents will benefit from the use of the present process. Other molding operations that are suitable for use with the process of the present invention include reactive molding operations, foamed plastic or rubber molding operations, and molding operations where emulsifiers hinder release effectiveness of release agents.

It is assumed that the application of release compounds has been or may be robotized. Therefore, the low pressure water rinse nozzle and vacuum or alternative mechanical device may be attached to an existing robot. This will provide a fully mechanized method of applying the release agent, rinsing the mold surface and removing the rinse water.

Fouling of the mold surface is a common problem in industrial molding operations. Such fouling may occur if the application of release agent failed or if the release film becomes abraded, for example. Cleaning the mold after fouling has occurred is a well-known problem to those skilled in the art. Often manual scrubbing is required to remove fouling from the mold surface.

The present invention has solved the problems associated with the presence of water on the mold surface, thus allowing the use of water for cleaning a fouled mold. When the process of the present invention is used, high-pressure water spray may be used for cleaning a fouled mold without fear of water affecting the quality of subsequently molded parts. High pressure spray may be any pressure at or above 100 psi. However, in the preferred embodiment, the high pressure cleaning spray delivered about 4 gallons per minute at about 3000 psi.

An additional benefit is afforded by incorporating an alternative high-pressure water supply circuit to the rinse nozzle of the present invention. High-pressure water spray applied to the mold through the rinse nozzle could be employed to remove fouling from the mold surface. This is particularly advantageous when the water spray and entrainment equipment have been robotized. Such a configuration affords the automatic high-pressure water cleaning of a fouled mold as well as the automatic removal of debris from such cleaning. Thus the rinse nozzle and entrainment system of the present invention can also be used for automated mold cleaning. It is envisioned that a control program would be developed so that when mold fouling is detected, an automated cleaning operation would be activated. Such an automated cleaning system would reduce labor and time in recovering from mold fouling.

To further illustrate the process, the following examples are given. It is to be understood that these examples are provided for illustrative purposes and are not to be construed as limiting the scope of the present invention.

EXAMPLES

Test Method

All examples used a mold consisting of two heated aluminum platens (the platens were heated and held between 155° F. and 160° F. for all tests) between which a two inch (2") long section of six inch (6") inside diameter aluminum pipe with a one-half inch (½") wall thickness (called a spacer) was clamped to form a cavity. When changing release agents, the spacer was removed, and the flat upper and lower heated platens were sanded and wiped clean to remove residue.

Several coats of the release agent emulsion (release compound) being evaluated were sprayed onto the cleaned platens before the first part of a series was formed. One or two coats of room temperature (about 20° C. to about 25°C.) release agent emulsion were applied without cleaning between parts in a series. Although, if desired, the release agent emulsion may be heated before application, it is not necessary to do so.

A line was scribed on the upper and lower platens so that they align when the mold is closed. After applying the release agent, the area to the right of the scribed line on the upper and lower platen was rinsed with hot hard water, having a temperature ranging between about 140° F. and about 150° F., in a low pressure spray (between about 10 psi and about 50 psi). Hot water was used to reduce the cooling of the mold platens. The rinse solution was removed by entrainment using a vacuum or nitrogen jet.

The spacer was placed on the lower platen so that the scribed line was centered on the cavity. A mixture of 60 grams polyol and 24 grams toluene diisocyanate was poured into the cavity, and the upper platen was closed and clamped. A cure time of three to three and one-half (3–3½) minutes was used for all tests.

The polyurethane part was removed from the mold, and the upper and lower surfaces were inspected. The degree of open cell structure on the rinsed versus unrinsed mold sections are reported as a percent. It is preferable in HR foamed plastics that the percentage of open cells should be high; since, if the cells are blocked, this would adversely affect or lower the desired high resilience of the molded foam part. Areas of foam structure collapse that are open to the surface are described as pocks. Areas of foam collapse with a skin at the surface are described as voids (blisters). Notations on surface appearance are also included.

Release Compounds Tested

RA-1: A dimethylsilicone fluid with aminoalkyl substitution, emulsified using tridecylalcoholethoxylate emulsifier. This emulsion is commercially available from Genesee Polymers Corporation in Flint, Michigan under the tradename GP-86-AE—SILICONE EMULSION. GP-86-AE is a proprietary amine functional silicone having the following properties. It is a light green to white opaque fluid having an ammonia odor. The specific gravity is 1.00; it is dispersible in water; and has a boiling point of 212° F. It has a vapor density heavier than air, and a flash point greater than 200° F. (93° C.).

RA-2: A blend of 60,000 cSt dimethylsilicone fluid with dimethylsilicone fluid containing aminoalkyl substitution, emulsified using tridecylalcoholethoxylate emulsifier. This emulsion is commercially available from Genesee Polymers Corporation in Flint, Michigan under the tradename GP-83-AE—SILICONE EMULSION. GP-83-AE is a proprietary amine functional silicone having the following properties. It is a white opaque fluid having a mild odor. The specific gravity is 0.99; it is dispersible in water; and has a boiling point of 212° F.

It has a vapor density heavier than air; and a pH of 9.0.

RA-3: A methylalkyl, methylalkylaryl silicone fluid containing aminoalkyl substitution, emulsified with tridecylalcoholethoxylate emulsifier. The methylalkyl, methylalkylaryl silicone fluid containing aminoalkyl substitution is commercially available from Genesee Polymers Corporation in Flint, Michigan under the tradename GP-7100—SILICONE FLUID. GP-7100 is a proprietary silicone polymer having the following properties. It is a clear, light straw fluid having a mild odor. The specific gravity is 1.00. It is soluble in aliphatic hydrocarbons and chlorinated solvents; and has a boiling point of greater than 200° F. It has a vapor density heavier than air; and a flash point greater than 200° F. (93° C.).

RA-4: An unknown water based wax emulsion, unknown emulsifier system.

RA-5: A 60,000 cSt (Internal Phase viscosity) dimethylsilicone fluid, emulsified using laurylalcohol-ethoxylate emulsifier. This emulsion is commercially available from Dow Corning Corporation in Midland, Michigan under the tradename 1664 EMULSION. 1664 is a proprietary, nonionic emulsion of a high molecular weight polydimethylsiloxane having the following properties. It is a milky white liquid. The specific gravity at 25° C. (77° F.) is 1.00. It has a pH of 3–5.

All release compounds were diluted to five percent (5%) non-volatile content with distilled water for these tests. The non-volatile content may range between about 2% and about 6%.

| RELEASE COMPOUND TEST RESULTS | | |
|---|---|---|
| RELEASE COMPOUND | UN-RINSED SURFACE | RINSED SURFACE |
| RA-1 | 25% open cell, several 6–8 mm voids | 50% open cell, no voids |
| RA-2 | 4–6 mm pocks, over entire surface | 100% open cell, with a few 2 mm pocks |
| RA-3 | Skin over entire surface, 8–10 mm voids throughout | 95% open cell, slight skin at edge |
| RA-4 | 0% open cell, 8–15 mm voids throughout | 0% open cell, no voids |
| RA-5 | 0% open cell, 6–12 mm pocks and voids throughout | 90% open cell, a few 7–12 mm pocks at one end |

The aqueous rinse and entrainment drying of the present invention improved the surface condition of all examples. It was indicated that hot water (ie. water at or about the temperature of the mold platen(s), in order to eliminate having to wait for the platen(s) to again reach the desired molding temperature) worked better than room temperature water for the release agent emulsions of these examples. However, even cold water has been successfully used in some tests.

Several parts were made using RA-3 wherein the release agent was applied and allowed to dry for thirty (30) seconds. Then, the complete mold surface was rinsed and dried with a nitrogen jet. The surface of the resulting parts was completely open cell structure and defect free.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A process for preparing a mold used for producing polymeric articles which are sensitive to aqueous release compounds, the mold having an inner, article-contacting surface, the process comprising the steps of:
    applying an aqueous release compound to the inner, article-contacting surface of the mold, the release compound including: an aqueous carrier; and a release agent which forms a release film on the article-contacting surface;
    applying an aqueous rinse solution to the inner, article-contacting surface of the mold after formation of the release film; and
    removing the rinse solution.

2. The process as defined in claim 1 wherein the aqueous release compound is applied by at least one of swabbing, brushing and spraying.

3. The process as defined in claim 2 wherein the aqueous release compound is applied by spraying.

4. The process as defined in claim 1 wherein the aqueous rinse solution is applied by at least one of spraying, pouring, swabbing and dipping.

5. The process as defined in claim 4 wherein the aqueous rinse solution is applied by spraying.

6. The process as defined in claim 5 wherein the spray has a pressure below about 100 psi.

7. The process as defined in claim 1 wherein the aqueous rinse solution is selected from the group consisting of hard water, soft water an d distilled water.

8. The process as defined in claim 7 wherein the aqueous rinse solution comprises hard water having a temperature ranging between about 140° F. and about 150° F.

9. The process as defined in claim 1 wherein the rinse solution is removed before a significant amount of water has evaporated from the rinse solution.

10. The process as defined in claim 9 wherein the rinse solution is mechanically removed by a means for air entrainment.

11. The process as defined in claim 10 wherein the air entrainment means comprises at least one of a vacuum and an air jet.

12. The process as defined in claim 1 wherein the release film is formed by evaporating a majority of the aqueous carrier.

13. The process as defined in claim 1 wherein the release compound comprises a high-energy emulsion.

14. The process as defined in claim 13 wherein the release film is formed by at least one of curing, emulsifier splitting and carrier evaporation.

15. The process as defined in claim 14 wherein the release film is formed when an amount of water has evaporated, which amount is sufficient to break the high-energy emulsion.

16. The process as defined in claim 1 wherein the polymeric article is molded by a reactive molding process.

17. The process as defined in claim 16 wherein the polymeric article is polyurethane foam.

18. A process for preparing a mold used for producing high resilience polyurethane foamed articles, the mold having an inner, article-contacting surface, the process comprising the steps of:

spraying an aqueous release compound on the inner, article-contacting surface of the mold, the release compound including: an aqueous carrier; and a release agent which forms a release film on the article-contacting surface, wherein the release film is formed by evaporating a majority of the aqueous carrier;

spraying an aqueous rinse solution on the inner, article-contacting surface of the mold after formation of the release film, wherein the spray has a pressure ranging between about 10 psi and about 50 psi; and mechanically removing the rinse solution.

19. The process as defined in claim 18 wherein the aqueous rinse solution comprises hard water having a temperature ranging between about 140° F. and about 150° F.

20. The process as defined in claim 19 wherein the rinse solution is removed by vacuum before a significant amount of water has evaporated from the rinse solution.

21. A process for preparing a mold and molding therein, from at least one moldable polymeric material, polymeric articles which are sensitive to aqueous release compounds, the mold having an inner, article-contacting surface, the process comprising the steps of:

applying an aqueous release compound to the inner, article-contacting surface of the mold, the release compound including an aqueous carrier, and a release agent which forms a release film on the article-contacting surface;

applying an aqueous rinse solution to the inner, article-contacting surface of the mold after formation of the release film;

removing the rinse solution;

introducing the at least one moldable polymeric material into the mold; and removing the polymeric article from the mold after molding has taken place;

wherein the polymeric article has substantially no surface and subsurface defects.

22. The process as defined in claim 21, further comprising the step of cleaning the inner, article-contacting surface of the mold with a high pressure spray.

23. The process as defined in claim 22 wherein the high pressure spray delivers water to the inner, article-contacting surface of the mold at a pressure of about 3000 psi.

* * * * *